United States Patent
Seo et al.

(10) Patent No.: US 12,202,922 B2
(45) Date of Patent: *Jan. 21, 2025

(54) MODIFYING AGENT AND MODIFIED CONJUGATED DIENE POLYMER PREPARED BY USING THE SAME

(71) Applicant: LG Chem, Ltd., Seoul (KR)

(72) Inventors: Kyung Chang Seo, Daejeon (KR); Ro Mi Lee, Daejeon (KR); No Ma Kim, Daejeon (KR); Jin Young Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 538 days.

This patent is subject to a terminal disclaimer.

(21) Appl. No.: 17/620,985

(22) PCT Filed: Nov. 4, 2020

(86) PCT No.: PCT/KR2020/015276
§ 371 (c)(1),
(2) Date: Dec. 20, 2021

(87) PCT Pub. No.: WO2021/107434
PCT Pub. Date: Jun. 3, 2021

(65) Prior Publication Data
US 2022/0372191 A1 Nov. 24, 2022

(30) Foreign Application Priority Data
Nov. 29, 2019 (KR) .................. 10-2019-0157389

(51) Int. Cl.
C08F 236/10 (2006.01)
C07F 7/18 (2006.01)
C08C 19/25 (2006.01)
C08F 212/08 (2006.01)

(52) U.S. Cl.
CPC .......... *C08F 236/10* (2013.01); *C07F 7/1804* (2013.01); *C08C 19/25* (2013.01); *C08F 212/08* (2013.01); *C08F 2810/00* (2013.01)

(58) Field of Classification Search
CPC ... C08F 8/30; C08F 8/42; C08C 19/22; C08C 19/25
See application file for complete search history.

(56) References Cited

U.S. PATENT DOCUMENTS

| 4,397,994 A | 8/1983 | Takeuchi et al. |
| 5,652,310 A | 7/1997 | Hsu et al. |
| 8,541,532 B2 * | 9/2013 | Sugioka ................. C07F 7/0838 525/474 |
| 2005/0159554 A1 * | 7/2005 | Endou ................. C08G 77/442 525/242 |
| 2010/0071827 A1 | 3/2010 | Miyazaki |
| 2011/0077325 A1 * | 3/2011 | Luo ........................ C08F 136/06 525/102 |
| 2011/0146877 A1 * | 6/2011 | Tanaka ....................... C08L 9/00 152/547 |
| 2012/0220716 A1 * | 8/2012 | Nakatani ................. C08C 19/25 556/425 |
| 2014/0187723 A1 | 7/2014 | Hsieh et al. |
| 2014/0256847 A1 | 9/2014 | Sato et al. |
| 2014/0357804 A1 | 12/2014 | Ito et al. |
| 2015/0073166 A1 | 3/2015 | Nakatani et al. |
| 2018/0223006 A1 | 8/2018 | Lee et al. |
| 2018/0258194 A1 | 9/2018 | Sohn et al. |
| 2018/0305470 A1 * | 10/2018 | Lee .......................... C08K 5/56 |
| 2019/0153124 A1 | 5/2019 | Seo et al. |
| 2019/0256617 A1 | 8/2019 | Lim et al. |
| 2020/0115485 A1 * | 4/2020 | Kim ..................... B60C 1/0041 |
| 2021/0179741 A1 | 6/2021 | Seo et al. |

FOREIGN PATENT DOCUMENTS

| EP | 3536720 A1 | 9/2019 |
| JP | H10007702 A | 1/1998 |
| JP | 2008208376 A | 9/2008 |
| JP | 2011057840 A | 3/2011 |
| JP | 5069593 B2 | 11/2012 |
| JP | 5245346 B2 | 7/2013 |
| JP | 2013142108 A | 7/2013 |
| JP | 2014122357 A | 7/2014 |
| KR | 20120083387 A | 7/2012 |
| KR | 20170106770 A | 9/2017 |
| KR | 20180018175 A | 2/2018 |
| KR | 20180038950 A | 4/2018 |
| RU | 2123015 C1 | 12/1998 |
| RU | 2428439 C2 | 9/2011 |
| RU | 2605250 C9 | 4/2017 |
| WO | 2017-191921 A1 | 11/2017 |
| WO | 2017188641 A2 | 11/2017 |
| WO | 2019216645 A1 | 11/2019 |

OTHER PUBLICATIONS

Lubkowska, Polimery 2014, 59, nr 11-12, p. 763-768 (Year: 2014).*
Extended European Search Report for Application No. 20891702.1 dated Nov. 16, 2022, pp. 1-4.
Basov, N.I. "Quality Control of Polymer Materials" (Kontrol' kachestva polimernykh materialov), Leningrad: Khimiya (Leningrad department), 1990, p. 12. [English Translation of Abstract only is attached].
D'yachkov, T.P. et al., "Methods for Functionalization and Modification of Carbon Nanotubes" (Metody Funktsionalizatsii i Modifikatsii Uglerodnykh Nanotrubok), Moscow: Spektr Publishing House, 2013, p. 3. [English Translation of Abstract only is attached].
International Search Report for Application No. PCT/KR2020/015276 mailed Feb. 9, 2021, 3 pages.

* cited by examiner

*Primary Examiner* — Robert C Boyle
(74) *Attorney, Agent, or Firm* — Lerner David LLP

(57) ABSTRACT

A modifying agent, a modified conjugated diene polymer prepared using the same, a method for preparing a modified conjugated diene polymer, and a rubber composition including a modified conjugated diene polymer are disclosed herein. In some embodiments, a modifying agent comprises a compound represented by formula 1. The modifying agent is capable of improving processability of a rubber composition including the polymer prepared using the modifying agent. Fuel consumption properties of a car using tires including the rubber composition may be improved.

10 Claims, No Drawings

MODIFYING AGENT AND MODIFIED CONJUGATED DIENE POLYMER PREPARED BY USING THE SAME

CROSS-REFERENCE TO RELATED APPLICATIONS

The present application is a national phase entry under 35 U.S.C. § 371 of International Application No. PCT/KR2020/015276, filed on Nov. 4, 2020, which claims priority from Korean Patent Application No. 10-2019-0157389, filed on Nov. 29, 2019, the entire contents of which are incorporated by reference herein.

TECHNICAL FIELD

The present invention relates to a modifying agent and a modified conjugated diene polymer prepared by using the same.

BACKGROUND ART

According to the recent demand for cars having a low fuel consumption ratio, a conjugated diene polymer having modulational stability represented by wet skid resistance as well as low rolling resistance, and excellent abrasion resistance and tensile properties is required as a rubber material for tires.

In order to reduce the rolling resistance of tires, there is a method of reducing hysteresis loss of vulcanized rubber, and rebound resilience at 50° C. to 80° C., tan δ, Goodrich heating, or the like is used as an evaluation index of the vulcanized rubber. That is, it is desirable to use a rubber material having high rebound resilience at the above temperature or a low tan δ value or Goodrich heating.

Natural rubbers, polyisoprene rubbers, or polybutadiene rubbers are known as rubber materials having low hysteresis loss, but these rubbers have a limitation of low wet skid resistance. Thus, recently, conjugated diene (co)polymers such as styrene-butadiene rubbers (hereinafter, referred to as "SBR") and butadiene rubbers (hereinafter, referred to as "BR"), are prepared by emulsion polymerization or solution polymerization to be used as rubbers for tires. Among these polymerization methods, the greatest advantage of the solution polymerization in comparison to the emulsion polymerization is that the vinyl structure content and the styrene content, which specify physical properties of the rubber, may be arbitrarily adjusted, and its molecular weight and physical properties may be controlled by coupling or modification. Thus, the SBR or BR rubber finally prepared by the solution polymerization is widely used as a rubber material for tires because it is easy to change a structure, and movement of chain terminals may be reduced and a coupling force with a filler such as silica and carbon black may be increased by coupling or modification of the chain terminals.

If the solution-polymerized SBR is used as the rubber material for tires, since a glass transition temperature of the rubber is increased by increasing the vinyl content in the SBR, physical properties such as running resistance and braking force, required for tires may be controlled, and fuel consumption may be reduced by appropriately adjusting the glass transition temperature.

The solution-polymerized SBR is prepared by using an anionic polymerization initiator and is being used by coupling or modifying the chain terminals of the polymer thus formed using various modifying agents. For example, U.S. Pat. No. 4,397,994 discloses a technique of coupling active anions of the chain terminals of a polymer obtained by polymerizing styrene-butadiene using alkyllithium which is a monofunctional initiator in a non-polar solvent, using a coupling agent such as a tin compound.

Meanwhile, as materials of a tire tread come in contact with the ground, materials having low running resistance, excellent wet grip and sufficient abrasion resistance for practical use are required.

Generally, as the reinforcing filler of a tire tread, carbon black, silica, and the like are used, and if silica is used as the reinforcing filler, there are advantages in that hysteresis loss is small and wet skid resistance is improved. However, in comparison to the carbon black with a hydrophobic surface, the silica with a hydrophilic surface has defects of low affinity with conjugated diene rubbers and poor dispersibility. Accordingly, a silane coupling agent is required to be additionally used for improving dispersibility or imparting between silica-rubber with bonding.

Accordingly, there are attempts to improve the silica dispersibility in a rubber composition by introducing a functional group having affinity or reactivity with silica at the terminal of a rubber molecule, and to reduce hysteresis loss by reducing the movement of the terminal of a rubber molecule by coupling with silica particles, but effects thereof are insufficient.

Therefore, the development of a rubber having excellent affinity with a filler including silica is required.

PRIOR ART DOCUMENT (Patent Document) U.S. Pat. No. 4,397,994 A

DISCLOSURE OF THE INVENTION

Technical Problem

The present invention has been devised to solve the above-mentioned problems of the conventional technique, and to provide a modifying agent easily introducing oligosiloxane and a tertiary amino group, which are functional groups having affinity with a filler, into a conjugated diene polymer and modifying the same.

Another object of the present invention is to provide a modified conjugated diene polymer showing excellent affinity with a filler in a rubber composition by being modified by the modifying agent and including a functional group derived from the compound in the polymer.

Another object of the present invention is to provide a method for preparing the modified conjugated diene polymer using the modifying agent.

Also, another object of the present invention is to provide a rubber composition including the modified conjugated diene polymer.

Technical Solution

To solve the above-described tasks, the present invention provides a modifying agent including a compound represented by Formula 1 below.

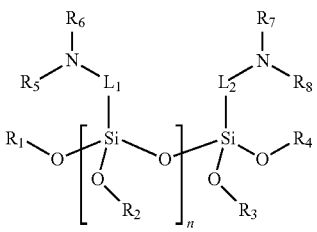

[Formula 1]

In Formula 1, $R_1$ to $R_8$ are each independently an alkyl group of 1 to 20 carbon atoms;

$L_1$ and $L_2$ are each independently an alkylene group of 1 to 20 carbon atoms; and n is an integer of 2 to 4.

In addition, the present invention provides a modified conjugated diene polymer including a functional group derived from the compound represented by Formula 1.

In addition, the present invention provides a method for preparing the modified conjugated diene polymer.

In addition, the present invention provides a rubber composition including the modified conjugated diene polymer.

Advantageous Effects

The modifying agent of the present invention includes oligosiloxane and a tertiary amino group, and if used for modifying a conjugated diene polymer and applied in a rubber composition, fuel consumption properties and processability may be improved in balance.

BEST MODE FOR CARRYING OUT THE INVENTION

Hereinafter, the present invention will be described in more detail in order to assist the understanding of the present invention.

It will be understood that words or terms used in the disclosure and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

The term "composition" as used in the present disclosure includes a mixture of materials including a corresponding composition as well as reaction products formed from the materials of the corresponding composition and decomposition products thereof.

The term "polymer" as used in the present disclosure refers to a polymer compound prepared by polymerizing monomers irrespective of the same or different types. Like this, a general term polymer refers to a polymer prepared from only one type of monomer but includes a commonly used term homopolymer and a term copolymer prescribed below.

The term "copolymer" as used in the present disclosure refers to a polymer prepared by polymerizing at least two types of different monomers. A general term copolymer refers to a polymer prepared from two different types of monomers, may refer to a terpolymer or a quaternary polymer according to the types of monomers used, and includes a polymer prepared from two or more different types of monomers.

The terms "comprising", "including" and "having" and the derivatives thereof, though these terms are particularly disclosed or not, do not intended to preclude the presence of optional additional components, steps, or processes. In order to avoid any uncertainty, all compositions claimed by using the term "comprising" may include optional additional additives, auxiliaries, or compounds, including a polymer or any other materials, unless otherwise described to the contrary. In contrast, the term "consisting essentially of ~" excludes unnecessary ones for operation and precludes optional other components, steps or processes from the scope of optional continuous description. The term "consisting of ~" precludes optional components, steps or processes, which are not particularly described or illustrated.

The present invention provides a modifying agent which is capable of introducing a tertiary amino group which is a functional group having affinity with a filler into a rubber, particularly, a conjugated diene polymer and modifying, wherein the modifying agent includes a compound represented by Formula 1 below.

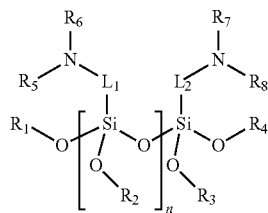

[Formula 1]

In Formula 1, $R_1$ to $R_8$ are each independently an alkyl group of 1 to 20 carbon atoms;

$L_1$ and $L_2$ are each independently an alkylene group of 1 to 20 carbon atoms; and n is an integer of 2 to 4.

Particularly, in Formula 1, $R_1$ to $R_4$ may be each independently a substituted or unsubstituted alkyl group of 1 to 20 carbon atoms, and in case where substituted, $R_1$ to $R_4$ may be each independently substituted with one or more substituents selected from the group consisting of an alkyl group of 1 to 10 carbon atoms, a cycloalkyl group of 3 to 10 carbon atoms, an alkoxy group of 1 to 10 carbon atoms, a cycloalkoxy group of 4 to 10 carbon atoms, an aryl group of 6 to 12 carbon atoms, an aryloxy group of 6 to 12 carbon atoms, an alkanoyloxy group of 2 to 12 carbon atoms ($R_a$COO—, where $R_a$ is an alkyl group of 1 to 9 carbon atoms), an aralkyloxy group of 7 to 13 carbon atoms, an arylalkyl group of 7 to 13 carbon atoms, and an alkylaryl group of 7 to 13 carbon atoms. More particularly, $R_1$ to $R_4$ may be substituted or unsubstituted alkyl groups of 1 to 10 carbon atoms, more particularly, $R_1$ to $R_4$ may be each independently a substituted or unsubstituted alkyl group of 1 to 6 carbon atoms.

Also, in Formula 1, $R_5$ to $R_8$ may be each independently a substituted or unsubstituted alkyl group of 1 to 20 carbon atoms, particularly, a substituted or unsubstituted alkyl group of 1 to 10 carbon atoms, more particularly, a substituted or unsubstituted alkyl group of 1 to 6 carbon atoms. If substituted, $R_5$ to $R_8$ may be substituted with the above-described substituents for $R_1$ to $R_4$. In case where $R_5$ to $R_8$ are not alkyl groups but hydrolysable groups, N—$R_5R_6$ and N—$R_7R_8$ bonds may be hydrolyzed in the presence of water into N—H, thereby adversely affecting the processability of a polymer.

More particularly, the compound represented by Formula 1 may be Formula 1 where $R_1$ to $R_4$ are each independently a methyl group or an ethyl group, and $R_5$ to $R_8$ are each independently an alkyl group of 1 to 10 carbon atoms.

In the present invention, the amino groups included in Formula 1, i.e., —$NR_5R_6$ and —$NR_7R_8$ may preferably be tertiary amino groups. The tertiary amino group allows even better processability in case where the compound of the present invention is used as a modifying agent.

In case where $R_5$ to $R_8$ are combined with protecting groups for protecting the amino groups or combined with hydrogen, the achievement of the effects according to the present invention may be difficult. In case of being combined with hydrogen, anions may react with the hydrogen during a modification process, thereby losing reactivity and disabling from performing modification reaction itself. In case of being combined with the protecting group, modification reaction may be performed, but during performing a subsequent processing in a state of being combined at the terminal of a polymer, deprotection reaction may be performed due to hydrolysis to produce primary or secondary amino groups. The deprotected primary or secondary amino groups may induce fragmentation phenomenon of a compound mixture during compounding afterward and may become a factor of degrading processability.

Also, in Formula 1, $L_1$ and $L_2$ may be each independently a substituted or unsubstituted alkylene group of 1 to 20 carbon atoms. More particularly, $L_1$ and $L_2$ may be each independently an alkylene group of 1 to 10 carbon atoms, more particularly, an alkylene group of 1 to 6 carbon atoms such as a methylene group, an ethylene group and a propylene group.

The closer the distance between an Si atom and an N atom in a molecule, better effects may be shown, but in case where Si and N are directly bonded, this bond is liable to break. As a result, the bond between Si and N may be broken during a subsequent process, and there is high probability of losing a secondary amino group thus produced by water during a subsequent treatment. In addition, in a modified conjugated diene polymer finally prepared, coupling with a silica filler is difficult due to the absence of an amino group which promotes the bonding with the silica filler, and as a result, the dispersing effects of a dispersant may be degraded. As described above, considering the excellent improving effects according to the bond length between Si and N, $L_1$ and $L_2$ may more preferably be each independently an alkylene group of 1 to 3 carbon atoms such as a methylene group, an ethylene group and a propylene group, more particularly, a propylene group. Also, $L_1$ and $L_2$ may be substituted with the substituents explained referring to $R_1$ to $R_4$, as described above.

More particularly, the compound represented by Formula 1 may be a compound represented by any one among Formula 1a to Formula 1e below.

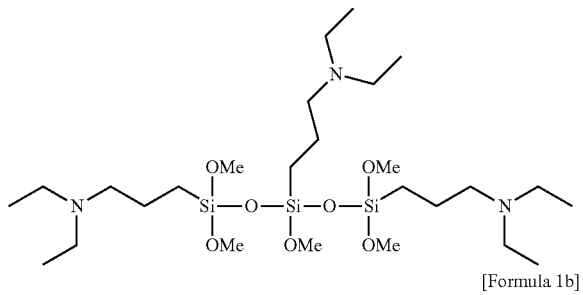

[Formula 1a]

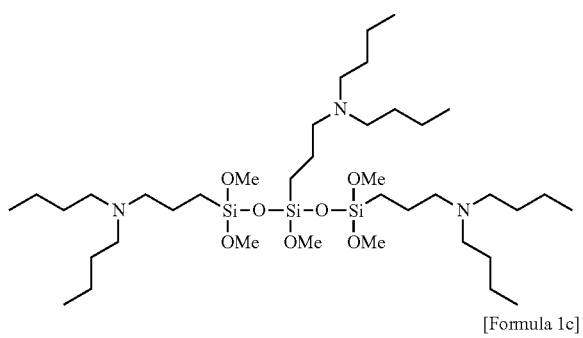

[Formula 1b]

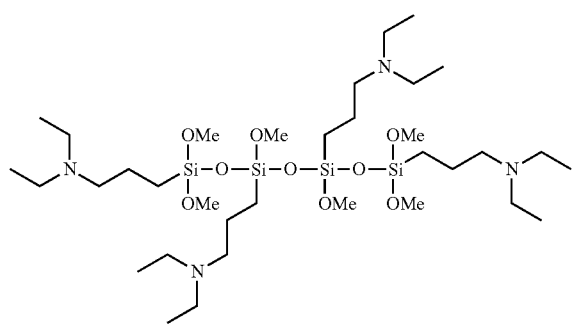

[Formula 1c]

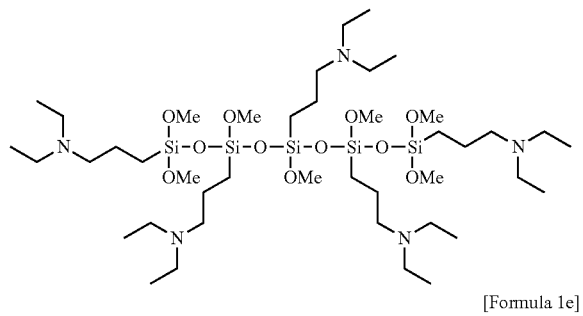

[Formula 1d]

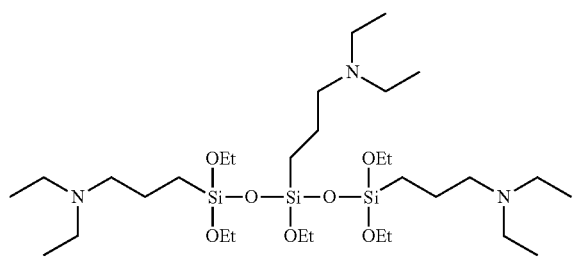

[Formula 1e]

In the modifying agent of the present invention, in the compound represented by Formula 1, an alkoxysilane structure is combined with the activated terminal of a conjugated diene polymer, and meanwhile, a Si—O—Si structure and three or more amino groups combined at the terminal show affinity with a filler such as silica, and accordingly, the coupling of a filler with a modified conjugated diene polymer may be promoted when compared with the conventional modifying agent including one amino group in a molecule. Also, since the coupling degree of the activated terminal of the conjugated diene polymer is uniform, if observing the change of molecular weight distribution before and after coupling, the molecular weight distribution is not increased but constant after coupling in comparison to before coupling. As a result, the physical properties of the modified conjugated diene polymer itself are not degraded, agglomeration of the filler in a rubber composition may be prevented, and the dispersibility of a filler is increased, thereby improving the processability of a rubber composition, particularly, improving the fuel consumption properties, abrasion properties and braking properties of tires in balance.

The modifying agent of the present invention may be a modifying agent for modifying the structure, properties and physical properties of a rubber and may particularly be a modifying agent of a conjugated diene polymer such as a butadiene polymer and a styrene-butadiene copolymer.

The modifying agent of the present invention may be prepared through condensation reaction represented by Reaction 1 below.

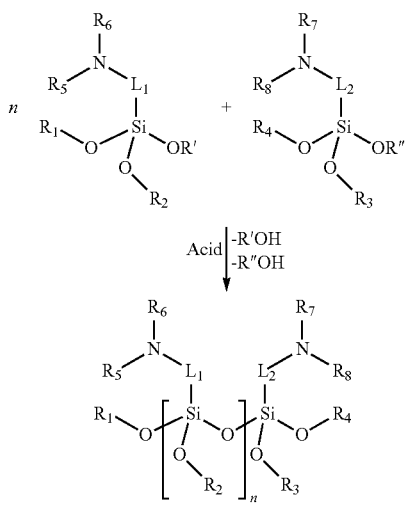

In Reaction 1, $R_1$ to $R_8$, $L_1$ to $L_2$, and n are the same as defined in Formula 1, and R' and R" are optional substituents not affecting the condensation reaction. For example, R' and R" may be each independently the same as any one among $R_1$ to $R_4$.

The reaction is performed under acid conditions, and any acids used for condensation reaction may be used without limitation. A person skilled in the art could select an optimal acid according to various process variables including the type of a reactor performing the reaction, starting materials, reaction temperature, etc.

The present invention provides a modified conjugated diene polymer which is modified by the modifying agent including the compound represented by Formula 1.

Particularly, the modified conjugated diene polymer may include a functional group derived from the compound represented by Formula 1.

In addition, the conjugated diene polymer may be a homopolymer of a conjugated diene monomer or a copolymer of a conjugated diene monomer and an aromatic vinyl monomer.

In case where the modified conjugated diene polymer is the copolymer, the copolymer may be a random copolymer in which structural units constituting the copolymer including a structural unit derived from the conjugated diene monomer and a structural unit derived from the aromatic vinyl monomer are arranged and coupled in disorder.

Particularly, the modified conjugated diene polymer may have narrow molecular weight distribution (Mw/Mn) (also referred to as polydispersity index (PDI)) of 1.1 to 3.0. If the molecular weight distribution of the modified conjugated diene polymer is greater than 3.0 or less than 1.1 and applied to a rubber composition, tensile properties and viscoelasticity may be deteriorated. Considering the marked improving effects of the tensile properties and viscoelasticity of a polymer according to the control of the molecular weight distribution, the molecular weight distribution of the modified conjugated diene polymer may particularly be 1.3 to 2.0. In addition, by using the modifying agent, the molecular weight distribution of the modified conjugated diene polymer is similar to that of the conjugated diene polymer before modification.

In the present invention, the molecular weight distribution of the modified conjugated diene polymer may be calculated from the ratio (Mw/Mn) of a weight average molecular weight (Mw) to a number average molecular weight (Mn). In this case, the number average molecular weight (Mn) is a common average of the molecular weight of individual polymer, which is calculated by measuring the molecular weights of n polymer molecules, obtaining the total of the molecular weights, and dividing the total by n, and the weight average molecular weight (Mw) represents the molecular weight distribution of a polymer composition. All average molecular weights may be represented by gram per mole (g/mol).

In addition, in the present invention, each of the weight average molecular weight and the number average molecular weight may mean a polystyrene converted molecular weight analyzed by gel permeation chromatography (GPC).

In addition, the modified conjugated diene polymer may satisfy the molecular weight distribution conditions and at the same time, have a number average molecular weight (Mn) of 50,000 g/mol to 2,000,000 g/mol, more particularly, 200,000 g/mol to 800,000 g/mol. In addition, the modified conjugated diene polymer may have a weight average molecular weight (Mw) of 100,000 g/mol to 4,000,000 g/mol, more particularly, 300,000 g/mol to 1,500,000 g/mol.

If the weight average molecular weight (Mw) of the modified conjugated diene polymer is less than 100,000 g/mol, or the number average molecular weight (Mn) is less than 50,000 g/mol, and if the polymer is applied to a rubber composition, it is apprehended that tensile properties may be degraded. In addition, if the weight average molecular weight (Mw) is greater than 4,000,000 g/mol, or the number average molecular weight (Mn) is greater than 2,000,000 g/mol, the processability of the modified conjugated diene polymer may be degraded, the workability of a rubber composition may be deteriorated, mulling may become difficult, and the sufficient improvement of the physical properties of the rubber composition may be difficult.

More particularly, if the modified conjugated diene polymer according to an embodiment of the present invention satisfies the weight average molecular weight (Mw) and the number average molecular weight conditions together with the molecular weight distribution, and is applied to a rubber composition, the viscoelasticity and processability of the rubber composition may be improved in balance.

In addition, the modified conjugated diene polymer may have the vinyl group content of 5 wt % or more, particularly, 10 wt % or more, more particularly, 10 wt % to 60 wt % based on the total weight of the polymer, and if the vinyl content is in the above-described range, the glass transition temperature may be controlled in a suitable range, and if applied to a tire, physical properties required for a tire such as running resistance and braking force may be improved.

In this case, the vinyl content is represented by percent on the content of the repeating unit of a derived structure of not 1,4-added but 1,2-added conjugated diene monomer based on the total weight of a conjugated diene copolymer composed of a monomer having a vinyl group or a conjugated diene monomer.

In addition, the modified conjugated diene polymer of the present invention has a mooney viscosity (MV) at 100° C. of 40 to 140, particularly, 60 to 100. If the mooney viscosity is in the above-described range, excellent processability may be shown.

In the present invention, the mooney viscosity may be measured by using a mooney viscometer, for example, MV2000E of Monsanto Co. using Large Rotor at a rotor speed of 2±0.02 rpm at 100° C. In this case, a specimen used was stood at room temperature (23±3° C.) for 30 minutes or more, and 27±3 g of the specimen was collected and put in a die cavity, and then, Platen was operated for measurement.

In addition, the present invention provides a method for preparing the modified conjugated diene polymer using the modifying agent including the compound represented by Formula 1.

The preparation method particularly includes 1) polymerizing a conjugated diene monomer, or an aromatic vinyl monomer and a conjugated diene monomer in the presence of an organic alkali metal compound in a hydrocarbon solvent to prepare an active polymer of which at least one terminal is coupled with an alkali metal; and 2) reacting the active polymer with a modifying agent including the compound represented by Formula 1.

Step 1) is a step for preparing an active polymer of which at least one terminal is coupled with an alkali metal, and may be performed by polymerizing a conjugated diene monomer, or an aromatic vinyl monomer and a conjugated diene monomer in the presence of an organic alkali metal compound in a hydrocarbon solvent.

In the polymerization in step 1), a conjugated diene monomer may be used alone or a conjugated diene monomer and an aromatic vinyl monomer may be used together. That is, the polymer prepared through the preparation method according to an embodiment of the present invention may be a homopolymer of the conjugated diene monomer or a copolymer derived from the conjugated diene monomer and the aromatic vinyl monomer.

Though the conjugated diene monomer is not specifically limited but may be, for example, one or more selected from the group consisting of 1,3-butadiene, 2,3-dimethyl-1,3-butadiene, piperylene, 3-butyl-1,3-octadiene, isoprene, and 2-phenyl-1,3-butadiene.

In case of using the conjugated diene monomer and the aromatic vinyl monomer together as the monomers, the conjugated diene monomer may be used in an amount such that a unit derived from the conjugated diene monomer in the modified conjugated diene polymer finally prepared becomes 60 wt % or more, particularly, 60 wt % to 90 wt %, more particularly, 60 wt % to 85 wt %.

The aromatic vinyl monomer is not specifically limited but may include, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene.

In case of using the conjugated diene monomer and the aromatic vinyl monomer together as the monomers, the aromatic vinyl monomer may be used in an amount such that a unit derived from the aromatic vinyl monomer in the modified conjugated diene polymer finally prepared becomes 40 wt % or less, particularly, 10 wt % to 40 wt %, more particularly, 15 wt % to 40 wt %.

The hydrocarbon solvent is not specifically limited but may be one or more selected from the group consisting of n-pentane, n-hexane, n-heptane, isooctane, cyclohexane, toluene, benzene and xylene.

The organic alkali metal compound may be used in 0.1 mmol to 1.0 mmol based on total 100 g of the monomer.

The organic alkali metal compound is not specifically limited but may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyl lithium, n-eicosyl lithium, 4-butylphenyl lithium, 4-tolyl lithium, cyclohexyl lithium, 3,5-di-n-heptylcyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide and lithium isopropylamide.

The polymerization in Step 1) may be performed by further adding a polar additive as necessary, and the polar additive may be added in 0.001 parts by weight to 1.0 part by weight based on total 100 parts by weight of the monomer. Particularly, the polar additive may be added in 0.005 parts by weight to 0.5 parts by weight, more particularly, 0.01 parts by weight to 0.3 parts by weight based on total 100 parts by weight of the monomer.

The polar additive may be one or more selected from the group consisting of tetrahydrofuran, ditetrahydrofurylpropane, diethyl ether, cycloamyl ether, dipropyl ether, ethylene dimethyl ether, ethylene dimethyl ether, diethyl glycol, dimethyl ether, tert-butoxyethoxyethane, bis(3-dimethylaminoethyl) ether, (dimethylaminoethyl) ethyl ether, trimethylamine, triethylamine, tripropylamine and tetramethylethylenediamine.

By using the polar additive in the preparation method according to an embodiment of the present invention, if the conjugated diene monomer and the aromatic vinyl monomer are copolymerized, the reaction rate difference therebetween may be compensated, and the easy preparation of a random copolymer may be induced.

The polymerization in step 1) may be performed by adiabatic polymerization or isothermal polymerization.

Here, the adiabatic polymerization represents a polymerization method including a step of polymerizing using self-generated heat of reaction without arbitrarily applying heat after injecting an organic alkali metal compound, and the isothermal polymerization represents a polymerization method by which the temperature of a polymer is kept constant by arbitrarily applying heat or taking heat after injecting the organic alkali metal compound.

The polymerization may be performed in a temperature range of −20° C. to 200° C., particularly, 0° C. to 150° C., more particularly, in a temperature range of 10° C. to 120° C.

Step 2) is a modification reaction step of reacting the active polymer with a modifying agent including a compound represented by Formula 1 to prepare a modified conjugated diene polymer.

In this case, the modifying agent including the compound represented by Formula 1 may be the same as described above. The compound represented by Formula 1 may be used in a ratio of 0.1 to 2.0 mol with respect to 1 mol of the organic alkali metal compound.

The reaction in step 2) is modification reaction for introducing a functional group into a polymer, and each reaction may be performed in a temperature range of 0° C. to 90° C. for 1 minute to 5 hours.

The preparation method according to an embodiment of the present invention may further include one or more steps among recovering and drying a solvent and an unreacted monomer as necessary after step 2).

Also, the present invention provides a rubber composition including the modified conjugated diene polymer.

The rubber composition may improve the physical properties of a molded article by including the modified conjugated diene polymer, and may improve fuel consumption properties, abrasion properties and braking properties in balance particularly in a tire.

Particularly, the rubber composition may include the modified conjugated diene polymer in 0.1 wt % or more and 100 wt % or less, particularly, 10 wt % to 100 wt %, more particularly, 20 wt % to 90 wt %. If the content of the modified conjugated diene polymer is less than 0.1 wt %, the improving effects of fuel consumption properties, abrasion properties and braking properties of a molded article manufactured using the rubber composition, for example, a tire may be consequently insignificant.

In addition, the rubber composition may further include other rubber components as necessary, in addition to the modified conjugated diene polymer, and in this case, the rubber component may be included in the content of 90 wt % or less based on the total weight of the rubber composition. Particularly, the rubber component may be included in an amount of 1 part by weight to 900 parts by weight based on 100 parts by weight of the modified conjugated diene polymer.

The rubber component may be a natural rubber or a synthetic rubber, and for example, the rubber component may be a natural rubber (NR) including cis-1,4-polyisoprene; a modified natural rubber which is obtained by modifying or purifying a common natural rubber, such as an epoxidized natural rubber (ENR), a deproteinized natural rubber (DPNR), and a hydrogenated natural rubber; and a synthetic rubber such as a styrene-butadiene copolymer (SBR), a polybutadiene (BR), a polyisoprene (IR), a butyl rubber (IIR), an ethylene-propylene copolymer, a polyisobutylene-co-isoprene, a neoprene, a poly(ethylene-co-propylene), a poly(styrene-co-butadiene), a poly(styrene-co-isoprene), a poly(styrene-co-isoprene-co-butadiene), a poly(isoprene-co-butadiene), a poly(ethylene-co-propylene-co-diene), a polysulfide rubber, an acryl rubber, a urethane rubber, a silicone rubber, an epichlorohydrin rubber, a butyl rubber, and a halogenated butyl rubber, and any one or mixtures of two or more thereof may be used.

In addition, the rubber composition may include a filler in 0.1 parts by weight to 150 parts by weight based on 100 parts by weight of the modified conjugated diene polymer.

The filler may particularly be a silica-based filler or a carbon black-based filler, and any one among them or a mixture of two thereof may be used.

More particularly, the filler may be silica, more particularly, wet silica (hydrated silicate), dry silica (anhydrous silicate), calcium silicate, aluminum silicate, or colloid silica. More particularly, the filler may be wet silica which has the most significant improving effect of destruction characteristics and compatible effects of wet grip.

Meanwhile, if the silica-based filler is used as the filler, a silane coupling agent may be used together for the improvement of reinforcing and low exothermic properties.

The silane coupling agent may particularly include bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, or dimethoxymethylsilylpropylbenzothiazolyltetrasulfide, and any one or mixtures of two or more thereof may be used. More particularly, bis(3-triethoxysilylpropyl)polysulfide or 3-trimethoxysilylpropylbenzothiazyltetrasulfide may be used as the silane coupling agent in consideration of the improving effect of reinforcing properties.

In addition, in the rubber composition according to an embodiment of the present invention, since a modified conjugated diene polymer in which a functional group having high affinity with a silica-based filler brought in an active part is used as a rubber component, the compounding amount of the silane coupling agent may be smaller than a common case. Particularly, the silane coupling agent may be used in 1 part by weight to 20 parts by weight based on 100 parts by weight of the silica-based filler. If used in the above range, effects as a coupling agent may be sufficiently shown, and preventing effects of gelation of a rubber component may be achieved. More particularly, the silane coupling agent may be used in 5 parts by weight to 15 parts by weight based on 100 parts by weight of the silica.

In addition, the rubber composition according to an embodiment of the present invention may be sulfur crosslinkable, and so may further include a vulcanizing agent.

The vulcanizing agent may particularly be a sulfur powder and may be included in 0.1 parts by weight to 10 parts by weight based on 100 parts by weight of a rubber component. If included in the above amount range, elasticity and strength required for a vulcanized rubber composition may be secured, and at the same time, a low fuel consumption ratio may be achieved.

In addition, the rubber composition according to an embodiment of the present invention may further include various additives used in a common rubber industry in addition to the above components, particularly, a vulcanization accelerator, a process oil, a plasticizer, an antiaging agent, a scorch preventing agent, a zinc white, stearic acid, a thermosetting resin, or a thermoplastic resin.

The vulcanization accelerator is not specifically limited but may particularly use thiazole-based compounds such as 2-mercaptobenzothiazole (M), dibenzothiazyldisulfide (DM), and N-cyclohexyl-2-benzothiazylsulfenamide (CZ), or guanidine-based compounds such as diphenylguanidine (DPG). The vulcanization accelerator may be included in 0.1 parts by weight to 5 parts by weight based on 100 parts by weight of the rubber component.

In addition, the process oil acts as a softener in a rubber composition and may particularly be a paraffin-based, naphthene-based, or aromatic compound, more particularly, an aromatic process oil may be used in consideration of tensile strength and abrasion resistance, and naphthene-based or paraffin-based process oils may be used in consideration of hysteresis loss and properties at a low temperature. The process oil may be included in an amount of 100 parts by weight or less based on 100 parts by weight of the rubber component. If included in the above-described range, the deterioration of the tensile strength and low exothermic properties (low fuel consumption ratio) of the vulcanized rubber may be prevented.

In addition, the antiaging agent may particularly include N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, or a condensate at a high temperature of diphenylamine and acetone. The antiaging agent may be used in 0.1 parts by weight to 6 parts by weight based on 100 parts by weight of the rubber component.

The rubber composition according to an embodiment of the present invention may be obtained by mulling using a mulling apparatus such as a banbury mixer, a roll, and an internal mixer according to a compounding prescription. In addition, a rubber composition having low exothermic properties and good abrasion properties may be obtained by a vulcanization process after a molding process.

Therefore, the rubber composition may be useful to the manufacture of each member of a tire such as a tire tread, an under tread, a side wall, a carcass coating rubber, a belt coating rubber, a bead filler, a chafer, and a bead coating rubber, or to the manufacture of rubber products in various industries such as a vibration-proof rubber, a belt conveyor, and a hose.

Also, according to another embodiment of the present invention, a molded article and a tire manufactured using the rubber composition are provided.

Hereinafter, the present invention will be explained in more detail referring to embodiments and experimental embodiments. However, the embodiments and experimental embodiments below are for illustrating the present invention, and the scope of the present invention is not limited thereby.

Example 1

To a first reactor among continuous reactors of three reactors connected in series, injected were a styrene solution in which 60 wt % of styrene was dissolved in n-hexane in a rate of 1.80 kg/h, a 1,3-butadiene solution in which 60 wt % of 1,3-butadiene was dissolved in n-hexane in a rate of 14.2 kg/h, n-hexane in a rate of 49.11 kg/h, a 1,2-butadiene solution in which 2.0 wt % of 1,2-butadiene was dissolved in n-hexane in a rate of 40 g/h, a solution in which 10 wt % of 2,2-(di(2-tetrahydrofuryl)propane was dissolved in n-hexane as a polar additive in a rate of 51.0 g/h, and an n-butyllithium solution in which 10 wt % of n-butyllithium was dissolved in n-hexane in a rate of 59.0 g/h. In this case, the temperature of the first reactor was maintained to 50° C.

Then, to the second reactor, a 1,3-butadiene solution in which 60 wt % of 1,3-butadiene was dissolved in n-hexane was injected in a rate of 0.74 kg/h. In this case, the temperature of the second reactor was maintained to 65° C.

The polymer was transported from the second reactor to a third reactor, and an n-hexane solution in which 10 wt % of a compound of Formula 1a was dissolved as a modifying agent was injected to the third reactor in a rate of 61.4 g/h. The temperature of the third reactor was maintained to 65° C.

After that, to a polymerization solution discharged from the third reactor, an IR1520 (BASF Co.) solution in which 30 wt % of an antioxidant was dissolved, was injected in a rate of 167 g/h and stirred. As a result, the polymer thus obtained was injected into hot water heated with steam and stirred to remove solvents and to prepare a both terminal-modified conjugated diene polymer.

[Formula 1a]

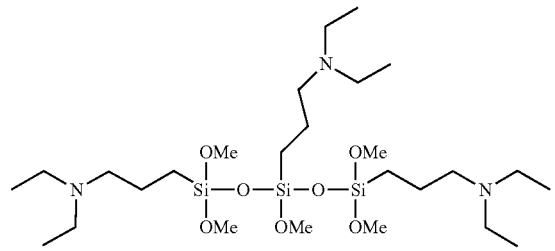

Example 2

A modified styrene-butadiene copolymer was prepared by performing the same method as in Example 1 except for injecting a compound of Formula 1b below, instead of the compound of Formula 1a in Example 1, as a modifying agent in an n-hexane solution at 10.0 wt % and at a rate of 78.1 g/h.

[Formula 1b]

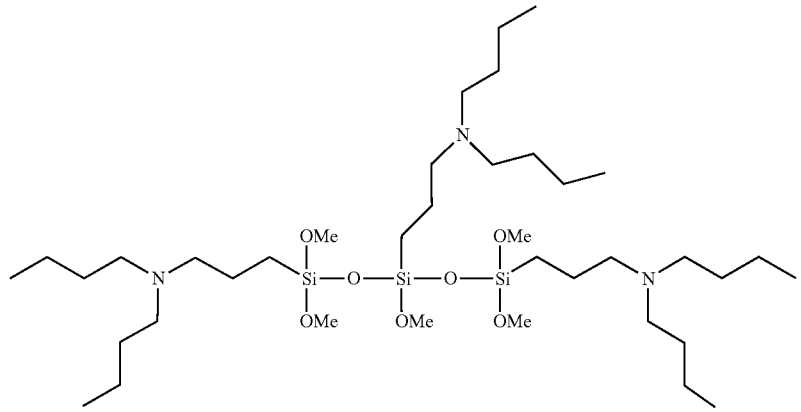

Example 3

A modified styrene-butadiene copolymer was prepared by performing the same method as in Example 1 except for injecting a compound of Formula 1c below, instead of the compound of Formula 1a in Example 1, as a modifying agent in an n-hexane solution at 10.0 wt % and at a rate of 80.3 g/h.

[Formula 1c]

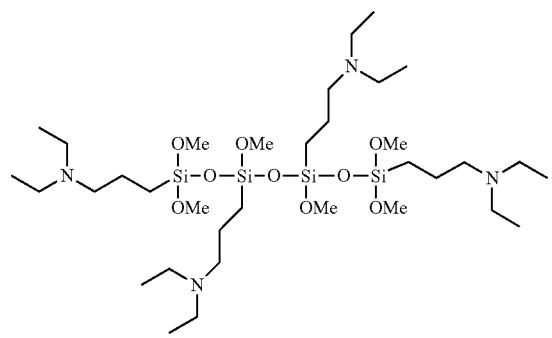

Example 4

A modified styrene-butadiene copolymer was prepared by performing the same method as in Example 1 except for injecting a compound of Formula 1d below, instead of the compound of Formula 1a in Example 1, as a modifying agent in an n-hexane solution at 10.0 wt % and at a rate of 99.3 g/h.

[Formula 1d]

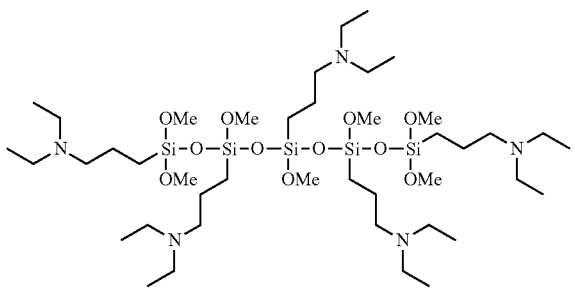

Example 5

A modified styrene-butadiene copolymer was prepared by performing the same method as in Example 1 except for injecting a compound of Formula 1e below, instead of the compound of Formula 1a in Example 1, as a modifying agent in an n-hexane solution at 10.0 wt % and at a rate of 68.4 g/h.

[Formula 1e]

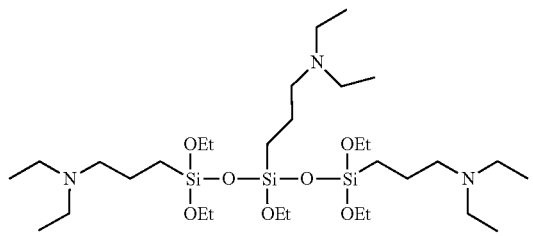

Comparative Example 1

An unmodified styrene-butadiene copolymer was prepared by performing the same method as in Example 1 except for not performing a modification reaction using a modifying agent.

Comparative Example 2

A modified styrene-butadiene copolymer was prepared by performing the same method as in Example 1 except for injecting a compound of Formula 2a below, instead of the compound of Formula 1a in Example 1, as a modifying agent in an n-hexane solution at 10.0 wt % and at a rate of 23.5 g/h.

[Formula 2a]

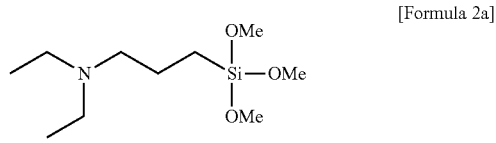

Comparative Example 3

A modified styrene-butadiene copolymer was prepared by performing the same method as in Example 1 except for injecting a compound of Formula 2b below, instead of the compound of Formula 1a in Example 1, as a modifying agent in an n-hexane solution at 10.0 wt % and at a rate of 42.5 g/h.

[Formula 2b]

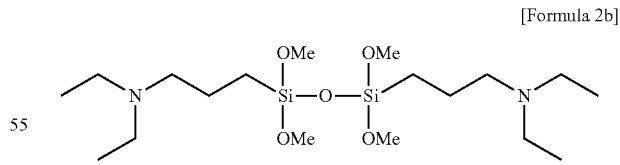

Comparative Example 4

A modified styrene-butadiene copolymer was prepared by performing the same method as in Example 1 except for injecting a compound of Formula 2c below, instead of the compound of Formula 1a in Example 1, as a modifying agent in an n-hexane solution at 10.0 wt % and at a rate of 74.6 g/h.

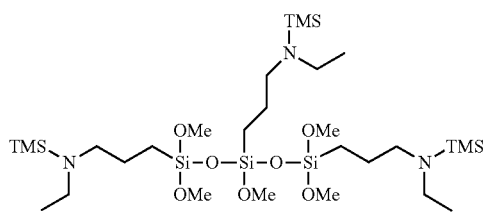

[Formula 2c]

Comparative Example 5

A modified styrene-butadiene copolymer was prepared by performing the same method as in Example 1 except for injecting a compound of Formula 2d below, instead of the compound of Formula 1a in Example 1, as a modifying agent in an n-hexane solution at 10.0 wt % and at a rate of 88.0 g/h.

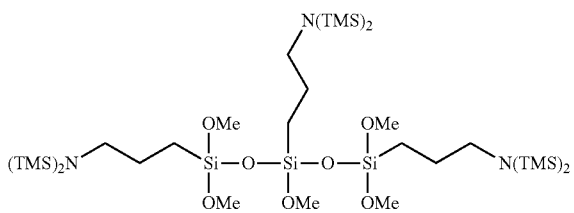

[Formula 2d]

Experimental Example 1

With respect to each of the modified styrene-butadiene polymers prepared in Examples 1 and 2, and Comparative Examples 1 to 5, a weight average molecular weight (Mw), a number average molecular weight (Mn), molecular weight distribution (or polydispersity index (PDI)), component analysis and a mooney viscosity (MV) were measured, and the results are shown in Table 1 below.

1) Component Analysis

The styrene derived unit (SM) and vinyl contents in each copolymer were measured using NMR.

2) Molecular Weight Analysis

The weight average molecular weight (Mw) and the number average molecular weight (Mn) of each copolymer were measured under 40° C. conditions by gel permeation chromatography (GPC) analysis. In this case, two columns of PLgel Olexis and one column of PLgel mixed-C of Polymer Laboratories Co. were used in combination, and newly replaced columns used were all mixed bed type columns. In addition, when calculating a molecular weight, polystyrene (PS) was used as a GPC standard material. The polydispersity index (PDI) was calculated from a ratio (Mw/Mn) of the weight average molecular weight and the number average molecular weight measured by the above method.

3) Analysis of Mooney Viscosity

The mooney viscosity of each copolymer was measured at 100° C. for 4 minutes after pre-heating two specimens having a weight of 15 g or more for 1 minute using MV-2000 (Alpha Technologies Co.).

TABLE 1

| Division | | Example 1 | Example 2 | Comparative Example 1 | Comparative Example 2 | Comparative Example 3 | Comparative Example 4 | Comparative Example 5 |
|---|---|---|---|---|---|---|---|---|
| Modifying agent | | 1a | 1b | — | 2a | 2b | 2c | 2d |
| Mooney viscosity (MV) | | 54 | 55 | 50 | 57 | 54 | 55 | 57 |
| NMR | Styrene content (wt % based on total weight of polymer) | 10 | 10 | 10 | 10 | 10 | 10 | 10 |
| | Vinyl content (wt % based on total weight of polymer) | 38 | 38 | 38 | 38 | 38 | 38 | 38 |
| GPC | Mn ($\times 10^4$ g/mol) | 312 | 308 | 310 | 310 | 317 | 290 | 320 |
| | Mw ($\times 10^4$ g/mol) | 484 | 484 | 459 | 490 | 482 | 447 | 493 |
| | PDI (Mw/Mn) | 1.55 | 1.57 | 1.48 | 1.58 | 1.52 | 1.60 | 1.54 |

Experimental Example 2

In order to compare and analyze the physical properties of a rubber composition including each of the modified styrene-butadiene copolymers prepared in Examples 1 and 2 and Comparative Examples 1 to 5, and a molded article manufactured therefrom, tensile properties and viscoelasticity properties were measured.

1) Preparation of Rubber Composition

Each rubber composition was prepared through a first stage mulling, a second stage mulling and a third stage mulling process. In this case, the amounts used of the materials except for the modified styrene-butadiene copolymer were shown based on 100 parts by weight of the modified styrene-butadiene copolymer. In the first stage mulling, 100 parts by weight of each copolymer, 70 parts by weight of silica, 11.02 parts by weight of bis(3-triethoxysilylpropyl)tetrasulfide as a silane coupling agent, 33.75 parts by weight of a process oil (TDAE), 2.0 parts by weight of an antiaging agent (TMDQ), 2.0 parts by weight of an antioxidant, 3.0 parts by weight of zinc oxide (ZnO), 2.0 parts by weight of stearic acid, and 1.0 part by weight of wax were compounded and mulled using a banbury mixer equipped with a temperature controlling apparatus in 80 rpm conditions. In this case, the temperature of the mulling apparatus was controlled, and a first compound mixture was obtained at a discharge temperature of 140° C.-150° C. In the second stage mulling, the first compound mixture was cooled to room temperature, and to the mulling apparatus, 1.75 parts by weight of a rubber accelerator (CZ), 1.5 parts by weight of a sulfur powder and 2.0 parts by weight of a vulcanization accelerator were added and then, mixed at a temperature of 60° C. or less to obtain a second compound mixture. Then, in the third stage mulling, the second compound mixture was molded and vulcanized using a vulcanizing press at 180° C. for t90+10 minutes to prepare each vulcanized rubber.

2) Tensile Properties

The tensile properties were measured by manufacturing each specimen (thickness 25 mm, length 80 mm) and measuring tensile strength when broken and tensile stress when stretched by 300% (300% modulus) of each specimen according to an ASTM 412 tensile test method. Particularly, tensile properties were measured by measuring using a tensile tester of Universal Test Machin 4204 (Instron Co.) in a rate of 50 cm/min at room temperature, and the tensile strength and the tensile stress when stretched by 300% (300% modulus) were obtained. Each value of the physical properties is recorded in Table 2 based on the numerical of Comparative Example 3 as 100. Higher numerical represents better results.

3) Viscoelasticity Properties

The viscoelasticity properties were obtained by measuring tan δ by changing deformation at each measurement temperature (0° C.-60° C.) with a frequency of 10 Hz in a twist mode using a dynamic mechanical analyzer (GABO Co.). If the tan δ at a high temperature of 60° C. decreases, hysteresis loss decreases, and low rotation resistance (fuel consumption ratio) becomes better. Each value of the physical properties is recorded in Table 2 based on the numerical of Comparative Example 3 as 100. Higher numerical represents better results.

4) Processability Properties

By measuring the mooney viscosity (MV, (ML 1+4, @100° C.) MU) of the second compounded mixture obtained during 1) preparation of rubber specimen, the processability properties of each polymer were compared and analyzed, and in this case, the lower the measured value of the moony viscosity is, the better the processability properties are.

Particularly, by using MV-2000 (Alpha Technologies Co.) and using Large Rotor at a rotor speed of 2±0.02 rpm at 100° C., each second compounded mixture was stood at room temperature (23±3° C.) for 30 minutes or more, and 27±3 g was collected and put in a die cavity, and then, Platen was operated for 4 minutes for measurement.

From the results of the experiments, the rubber compositions including the modified styrene-butadiene copolymers of Examples 1 to 5, which were modified using the modifying agent according to the present invention, showed excellent viscoelasticity when compared with Comparative Examples 1 to 3. The effects shown are explained because the modifying agents applied in Examples 1 to 5 were oligomers. In addition, viscoelasticity was similar, but processability was improved when compared with Comparative Examples 4 and 5, in which primary or secondary amino group was introduced.

The invention claimed is:

1. A modifying agent comprising a compound represented by the following Formula 1:

[Formula 1]

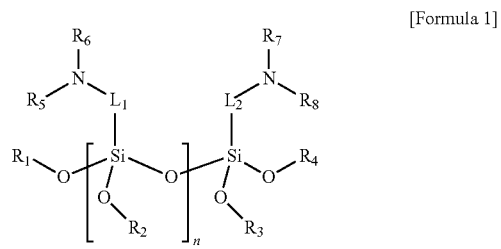

in Formula 1,
$R_1$ to $R_8$ are each independently an alkyl group of 1 to 20 carbon atoms,
$L_1$ and $L_2$ are each independently an alkylene group of 1 to 20 carbon atoms, and
n is an integer of 2 to 4.

2. The modifying agent according to claim 1, wherein $R_1$ to $R_8$ are each independently an alkyl group of 1 to 10 carbon atoms.

3. The modifying agent according to claim 2, wherein $R_1$ to $R_8$ are each independently an alkyl group of 1 to 6 carbon atoms.

4. The modifying agent according to claim 1, wherein $R_1$ to $R_4$ are each independently a methyl group or an ethyl group, and $R_5$ to $R_8$ are each independently an alkyl group of 1 to 10 carbon atoms.

5. The modifying agent according to claim 1, wherein the compound represented by Formula 1 is any one selected from the group consisting of the following Formula 1a to Formula 1e:

TABLE 2

| Division | Example 1 | Example 2 | Comparative Example 1 | Comparative Example 2 | Comparative Example 3 | Comparative Example 4 | Comparative Example 5 |
|---|---|---|---|---|---|---|---|
| Tensile strength (Index) | 103 | 101 | 95 | 99 | 100 | 100 | 97 |
| 300% modulus (Index) | 105 | 101 | 94 | 96 | 100 | 99 | 98 |
| Tan δ @0° C. (Index) | 101 | 102 | 90 | 101 | 100 | 102 | 99 |
| Tan δ @60° C. (Index) | 111 | 115 | 81 | 91 | 100 | 112 | 109 |
| Processability properties (mooney viscosity, MV) | 56 | 53 | 67 | 53 | 55 | 75 | 81 |

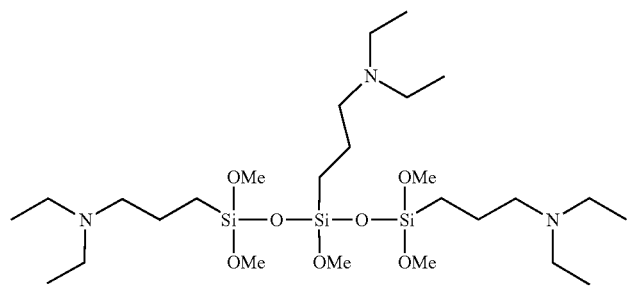
[Formula 1a]
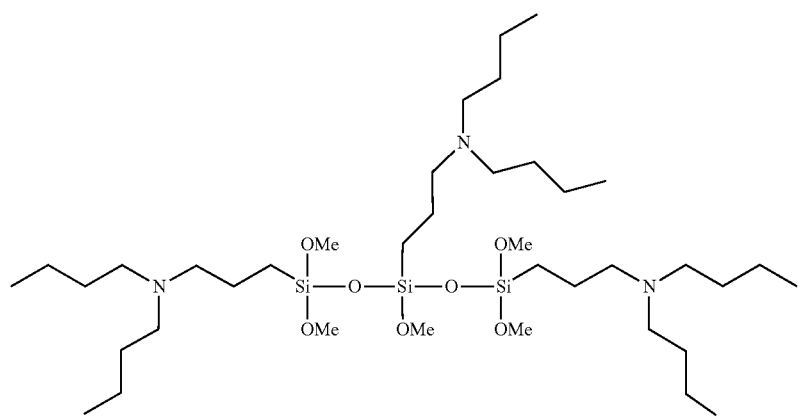
[Formula 1b]
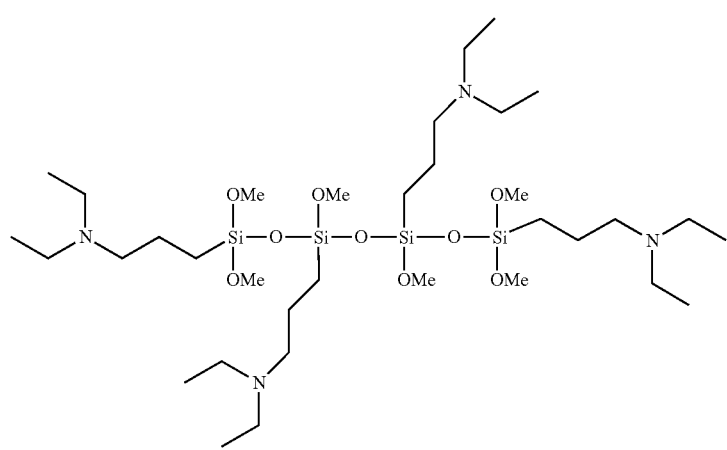
[Formula 1c]

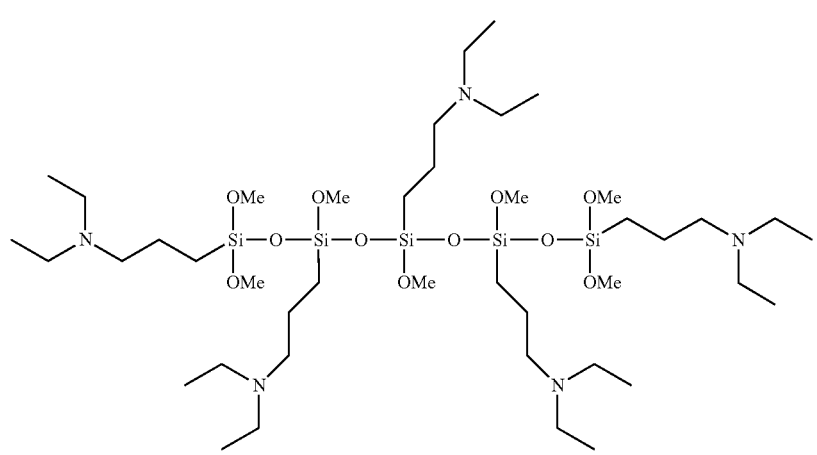

[Formula 1d]

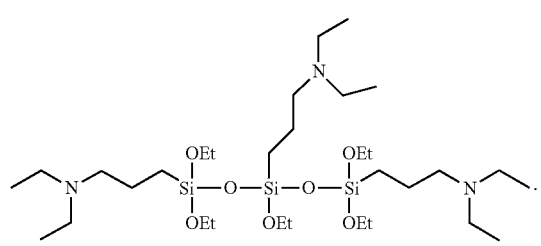

[Formula 1e]

6. A modified conjugated diene polymer comprising a functional group derived from a compound represented by the following Formula 1:

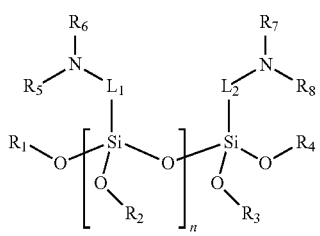

[Formula 1]

in Formula 1,
$R_1$ to $R_8$ are each independently an alkyl group of 1 to 20 carbon atoms,
$L_1$ and $L_2$ are each independently an alkylene group of 1 to 20 carbon atoms, and
n is an integer of 2 to 4.

7. The modified conjugated diene polymer according to claim 6, wherein the modified conjugated diene polymer is a homopolymer of a conjugated diene monomer or a copolymer of a conjugated diene monomer and an aromatic vinyl monomer.

8. The modified conjugated diene polymer according to claim 6, wherein the modified conjugated diene polymer has a number average molecular weight of 50,000 g/mol to 2,000,000 g/mol, a weight average molecular weight of 100,000 g/mol to 4,000,000 g/mol, and molecular weight distribution of 1.1 to 3.0.

9. The modified conjugated diene polymer according to claim 6, wherein the modified conjugated diene polymer has a mooney viscosity at 100° C. of 40 to 140.

10. A method for preparing a modified conjugated diene polymer, the method comprising:
polymerizing a conjugated diene monomer, or an aromatic vinyl monomer and a conjugated diene monomer, in the presence of an organic alkali metal compound in a hydrocarbon solvent to prepare an active polymer of which at least one terminal is coupled with an alkali metal; and
reacting the active polymer with a modifying agent comprising a compound represented by the following Formula 1:

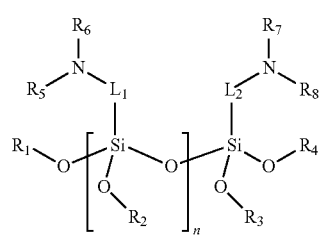

[Formula 1]

in Formula 1,
$R_1$ to $R_8$ are each independently an alkyl group of 1 to 20 carbon atoms,
$L_1$ and $L_2$ are each independently an alkylene group of 1 to 20 carbon atoms, and
n is an integer of 2 to 4.

* * * * *